(12) United States Patent
Fujita

(10) Patent No.: US 8,547,852 B2
(45) Date of Patent: Oct. 1, 2013

(54) COMMUNICATING DEVICE AND METHOD OF CONTROLLING COMMUNICATING DEVICE

(75) Inventor: Hiroshi Fujita, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 273 days.

(21) Appl. No.: 12/971,428

(22) Filed: Dec. 17, 2010

(65) Prior Publication Data

US 2011/0158099 A1     Jun. 30, 2011

(30) Foreign Application Priority Data

Dec. 28, 2009    (JP) ................................. 2009-297802

(51) Int. Cl.
    *H04L 12/26*       (2006.01)
    *H04W 4/00*        (2009.01)

(52) U.S. Cl.
    USPC ............................ 370/238; 370/237; 370/328

(58) Field of Classification Search
    USPC ............................................. 370/238, 238.1
    See application file for complete search history.

(56) References Cited

U.S. PATENT DOCUMENTS

| | | | |
|---|---|---|---|
| 6,532,212 B1 * | 3/2003 | Soloway et al. | ............... 370/230 |
| 2008/0186907 A1 | 8/2008 | Yagyuu et al. | |
| 2009/0073921 A1 | 3/2009 | Ji et al. | |

FOREIGN PATENT DOCUMENTS

| | | |
|---|---|---|
| EP | 1 942 614 | 7/2008 |
| JP | 2003-224882 | 8/2003 |
| JP | 2003-249936 | 9/2003 |
| JP | 2007-243575 | 9/2007 |
| JP | 2007-288578 | 11/2007 |
| WO | 2005/062554 | 7/2005 |
| WO | WO 2005062554 A1 * | 7/2005 |
| WO | 2006/059643 | 6/2006 |

OTHER PUBLICATIONS

Extended European Search Report with Annex and written opinion, issued for corresponding European Patent Application No. 10 19 6815.4, dated Apr. 29, 2011.
Kyu-Han Kim et al.:"On Accurate and Asymmetry-Aware Measurement of Link Quality in Wireless Mesh Networks" IEEE/ACM Transactions on Networking vol. 17, pp. 1172-1185, Aug. 1, 2009; [Ref.: EESR dated Apr. 29, 2011].

* cited by examiner

*Primary Examiner* — Ian M Moore
*Assistant Examiner* — Eric P Smith
(74) *Attorney, Agent, or Firm* — Myers Wolin, LLC

(57) ABSTRACT

A communicating device capable of transmitting packets to a destination device via any of a plurality of adjacent devices, has a first measuring unit for measuring a first quality of a link between the communicating device and the destination device for a first period of time, a second measuring unit for measuring a second quality of a link from the communicating device to the destination device for a second period of time shorter than the first period of time, a first selector for selecting an adjacent device from the plurality of adjacent devices based on the measured first quality when transmitting a new packet to the destination device, and a second selector for selecting an adjacent device from the plurality of adjacent devices based on the measured second quality upon failure of transmitting the new packet.

7 Claims, 13 Drawing Sheets

| ADJACENT NODE | AVERAGE LINK QUALITY VALUE WITH SELF-NODE |
|---|---|
| B | AS_b |
| C | AS_c |
| D | AS_d |
| ⋮ | ⋮ |

FIG. 6

| ADJACENT NODE | NODE WHICH CAN BE CONNECTED TO ADJACENT NODE | AVERAGE LINK QUALITY WITH SELF-NODE |
|---|---|---|
| B | E | AS_e |
| B | G | AS_g1 |
| C | F | AS_f |
| C | G | AS_g2 |
| D | ⋮ | ⋮ |

FIG. 7

| ADJACENT NODE | INSTANTANEOUS LINK QUALITY VALUE WITH SELF-NODE |
|---|---|
| B | IS_b |
| C | IS_c |
| D | IS_d |
| ⋮ | ⋮ |

FIG. 13

| ADJACENT NODE | WIRELESS QUALITY VALUE | TRAFFIC CONGESTION DEGREE | FADING PITCH |
|---|---|---|---|
| B | SINR_b | TC_b | FP_b |
| C | SINR_c | TC_c | FP_c |
| D | SINR_d | TC_d | FP_d |
| ⋮ | ⋮ | ⋮ | ⋮ |

COMMUNICATING DEVICE AND METHOD OF CONTROLLING COMMUNICATING DEVICE

CROSS-REFERENCE TO RELATED APPLICATION

This application is based upon and claims the benefit of priority of the prior Japanese Patent Application No. 2009-297802, filed on Dec. 28, 2009, the entire contents of which are incorporated herein by reference.

FIELD

The present art relates to a technology for carrying out ad hoc communication in a network to which a plurality of nodes belongs.

BACKGROUND

An ad hoc wireless network is a wireless network which enables wireless communication devices to directly communicate with each other, and enables wireless communication devices being so apart from each other that radio waves do not directly reach between them to let a wireless communication device existing between them relay the radio waves so as to carry out mutual communication. Respective nodes which are wireless communication devices are autonomously formed in the ad hoc wireless network. Each of the nodes carries out a process as a router so as to enable a relay between the nodes. Incidentally, the ad hoc wireless network is called a multi-hop wireless network, as well.

Reactive and proactive protocols are known as routing protocols for controlling a communication path for a data relay in the ad hoc wireless network. According to the reactive protocol, a communication path is searched and determined when a communication session starts. According to the proactive protocol, messages are exchanged between adjacent nodes before a communication session starts so that a communication path is determined in advance. The adjacent nodes exchange the messages in accordance with the proactive protocol by, e.g., broadcasting a control packet such as a HELLO packet.

Various methods have been proposed for the routing protocol, i.e., a method for communication path control, of the ad hoc wireless network. It is known, e.g., that the nodes each hold connection probability indicating connectivity to their adjacent nodes, and change the communication path based on a change of the connection probability. The connection probability is calculated by a signal-to-noise ratio on an adjacent link with an adjacent node, etc.

[Patent Document 1] Japanese Laid-open Patent Publication No. 2007-243575

Incidentally, according to an ordinary method for communication path control in the ad hoc wireless network, quality of a link that reaches an addressed node is measured every regular period of time, e.g., every period for transmitting a broadcast packet. Then, a path is selected from a plurality of path candidates which reach the addressed node based on an average value of link quality of the respective path candidates for the regular period of time. A try at selecting a path based on an average value of link quality for a regular period of time, however, may possibly cause improper path selection in a case where the link quality between the adjacent nodes drops in an instant. That is, if the link quality with an adjacent node on a path selected owing to a high average value of the link quality drops a lot in an instant, data is not correctly transmitted to the adjacent node and retransmission of the data occurs. Thus, a period of time required for the data communication between the nodes is extended.

SUMMARY

According to an aspect of an invention, a communicating device capable of transmitting packets to a destination device via any of a plurality of adjacent devices, the communicating device has a first measuring unit for measuring a first quality of a link between the communicating device and the destination device for a first period of time based on the packets transmitted between the communicating device and the destination device, a second measuring unit for measuring a second quality of a link from the communicating device to the destination device for a second period of time shorter than the first period of time based on the packets transmitted between the communicating device and the destination device, a first selector for selecting an adjacent device from the plurality of adjacent devices based on the measured first quality of the link when transmitting a new packet to the destination device, and a second selector for selecting an adjacent device from the plurality of adjacent devices based on the measured second quality of the link upon failure of transmitting the new packet.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates an exemplary topology list held by the node of the second embodiment;

FIG. 7 illustrates an exemplary instantaneous link quality list held by the node of the second embodiment;

FIG. 13 illustrates an exemplary instantaneous link quality list held by the node of the third embodiment;

DESCRIPTION OF EMBODIMENTS (1) First Embodiment

An ad hoc wireless network (suitably shortened as "network" hereafter) of a first embodiment will be explained below.

Figures 1, 2:
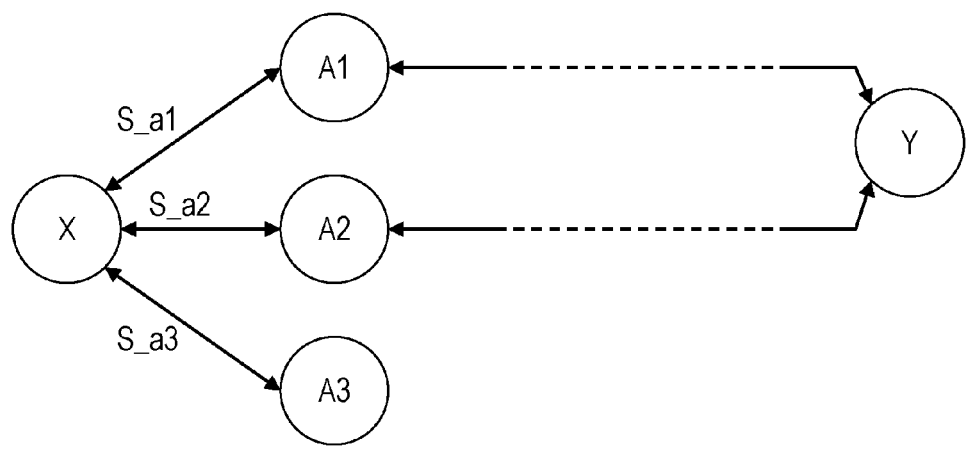
FIG. 1 illustrates an exemplary configuration of an ad hoc wireless network of a first embodiment.
FIG. 2 illustrates exemplary link data on a sending node of the first embodiment.

(1-1) Ad hoc Wireless Network of the Embodiment:

FIG. 1 illustrates an exemplary configuration of the ad hoc wireless network of the embodiment. The ad hoc wireless network illustrated in FIG. 1 includes nodes X, A1-A3 and Y which are wireless communication devices. Assume that the node X transmits data to the node Y in the above ad hoc wireless network. That is, the nodes X and Y are a sending node and an addressed node, respectively.

Each of the nodes broadcasts a control packet such as a HELLO packet in the ad hoc wireless network of the embodiment. That is, each of the nodes in the network transfers a control packet received from an adjacent node to another adjacent node in order. Each of the nodes in the network thereby gains information about nodes except for the self-node. The control packet transmitted from each of the nodes includes data concerning an adjacent node which can communicate with the self-node and data concerning an index of link quality between the self-node and the adjacent node.

Each of the nodes successively produces topology data indicating connection relations among the nodes in the network based on the data concerning the adjacent nodes (called "adjacent node data" hereafter) included in the control packets transferred from other nodes. The adjacent node data coming from other nodes can change every moment as a new node participates in the network, as one of the nodes leaves the network, or as the nodes move in the network. Thus, the topology data produced by the respective nodes is successively updated.

Each of the nodes successively updates link quality data for every one of a plurality of paths from the self-node to the addressed node for data communication based on the data concerning the index of link quality (called "link quality value" hereafter) included in the control packets transferred from other nodes. The link quality value in the control packet includes a link quality value between adjacent nodes for every first period of time. The first period of time is a relatively long period of time to be set for gaining steady link quality for a regular period of time. The first period of time is, e.g., although not limited to, same as an interval for transmitting the control packet. The link quality value for every first period of time is, e.g., an average link quality value for the first period of time for which a plurality of samples of link quality values gained for the first period of time is statistically processed.

The link quality value for every first period of time is, e.g., a value indicating wireless quality between adjacent nodes, a degree of traffic congestion between adjacent nodes, etc. The value indicating wireless quality is, e.g., an SNIR (Signal to Interference-plus-Noise Ratio), an SNR (Signal to Noise Ratio), a CNIR (Carrier to Interference-plus-Noise Ratio), an RSSI (Received Signal Strength Indicator), etc. The degree of traffic congestion is, e.g., a rate of successful transmission within a regular period of time (i.e., a rate of no occurrence of retransmission), a result of carrier sensing for sensing a collision between signals of transmitting nodes, a frequency of disabled data transmission (a frequency of being "Busy") within a regular period of time. The degree of traffic congestion can be related to degrees to which the nodes each accumulate data in respective transmission buffers.

The sending node which transmits data to the addressed node in the ad hoc wireless network of the embodiment searches for one node or a plurality of nodes which can be connected to adjacent nodes based on the topology data. Incidentally, the "nodes which can be connected to adjacent nodes" are not limited to nodes which can directly communicate with adjacent nodes by wireless, and are all nodes which can communicate on the topology of the network. The sending node gains one path candidate or a plurality of path candidates reaching the data-addressed node by searching for the nodes. Further, the sending node calculates at least a link quality value of each of the path candidates based on the link quality value for every first period of time. The sending node calculates the link quality of each of the path candidates by, e.g., multiplying the link quality values of all two adjacent nodes on the path candidate from the sending node to the addressed node together, and normalizing the product, etc.

Further, the sending node measures, as the link quality value between the self-node and an adjacent node in the ad hoc wireless network of the embodiment, link quality every second period of time which is shorter than the first period of time. The link quality measured every second period of time is, e.g., although not limited to, an instantaneous value of the link quality. The link quality value for every second period of time can be, e.g., an average link quality value for the second period of time for which a plurality of samples of link quality values gained for the second period of time which is shorter than the first period of time is statistically processed.

Incidentally, the link quality value in the control packet includes the link quality value between the adjacent nodes for every first period of time, as explained above. Nonetheless, the control packet can include the link quality value for every second period of time. In that case, a plurality of samples of the link quality values for every second period of time in the control packet is statistically processed, e.g., averaged, so that each of the nodes calculates the link quality value of each of the path candidates every first period of time.

(1-2) Link Data:

Then, the sending node manages link data in the ad hoc wireless network of the embodiment, which will be explained below. FIG. 2 illustrates exemplary link data on the node X being a sending node in FIG. 1. As illustrated in FIG. 2, the link data includes (a) adjacent nodes of the self-node, (b) link quality values between the self-node and the respective adjacent nodes for every second period of time, (c) nodes which can be connected to the respective adjacent nodes, and (d) link quality values between the self-node and the respective nodes of (c) for every first period of time.

The link data illustrated in FIG. 2 will be explained with reference to FIG. 1. The sending node X knows an adjacent node of the self-node upon establishing a communication session with the adjacent node (FIG. 2(a)). As illustrated in FIG. 1, e.g., the adjacent nodes of the sending node X are the nodes A1-A3. In FIG. 2, only the node A1 is exemplarily illustrated from the adjacent nodes A1-A3.

The sending node X successively measures link quality values with the respective adjacent nodes every second period of time (FIG. 2(b)). FIGS. 1 and 2 illustrate an exemplary case in which the link quality value between the sending node and the adjacent node A1 for every second period of time is S_a1.

The sending node X searches for nodes which can be connected to the respective adjacent nodes based on the topology data produced by means of the control packets of other nodes (FIG. 2(c)). As illustrated in FIG. 1, e.g., the data-addressed node Y is included in a plurality of nodes which can be connected to the adjacent node A1. A path through which the data is transmitted to the addressed node Y via the adjacent node A1 is one of a plurality of path candidates through which the sending node X transmits the data to the addressed node Y.

The sending node X calculates at least a link quality value of each of the path candidates every first period of time (FIG. 2(d)). The sending node X calculates the link quality of each of the path candidates every first period of time by, e.g., multiplying the link quality values of all two adjacent nodes on the path candidate from the sending node X to the addressed node Y together and normalizing the product, etc. FIG. 2 illustrates an exemplary case in which the link quality value of the path candidate from the sending node X, via the adjacent node A1, to the addressed node Y for every first period of time is S_y.

The sending node X successively updates the link data held by the self-node similarly as the topology data based on data included in the control packets successively transferred from other nodes.

Figure 3:
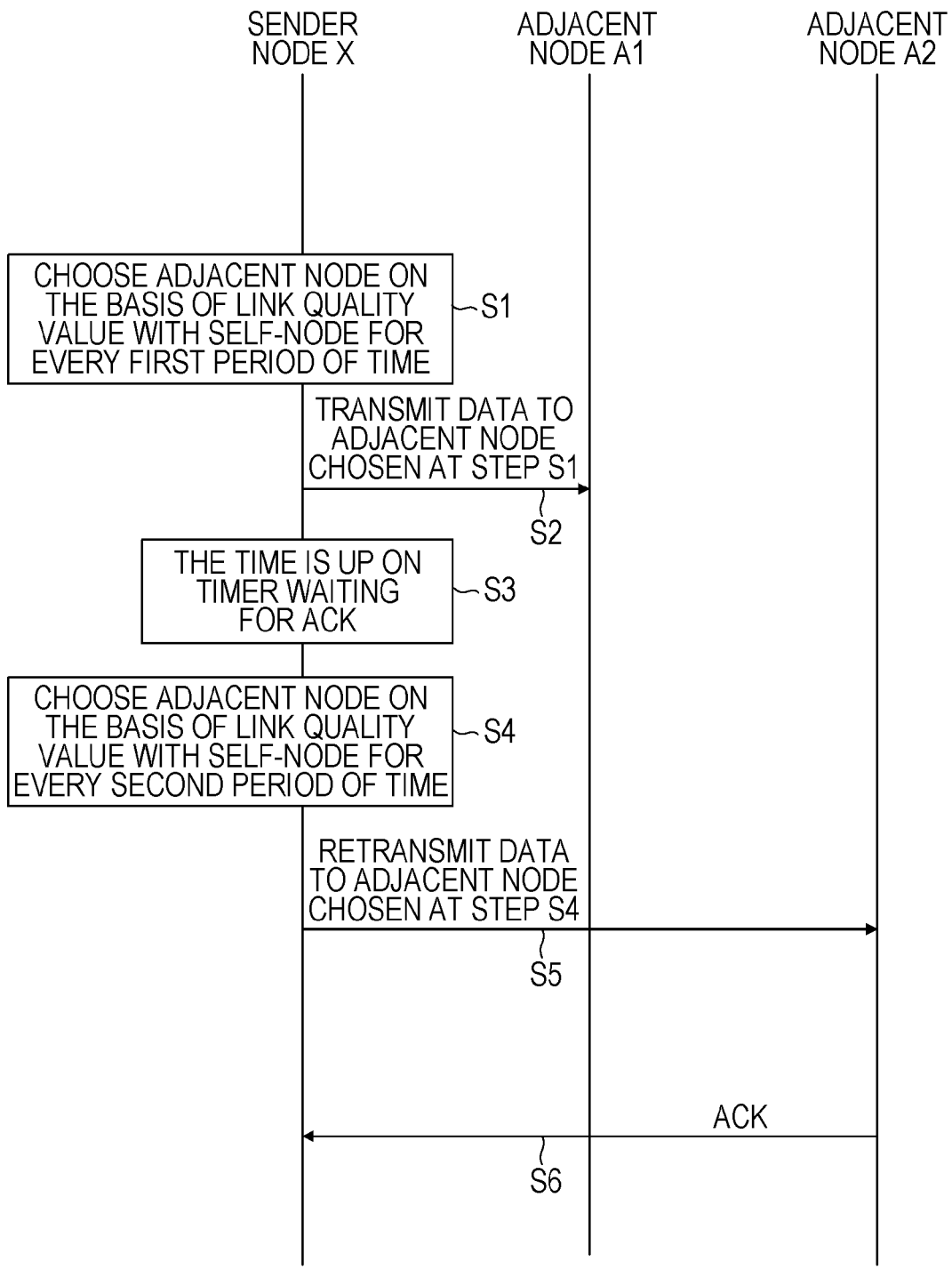
FIG. 3 is a flowchart for illustrating a method for data communication from the sending node to an addressed node of the first embodiment.

(1-3) Method for Communication of the Embodiment:

Then, a method for data communication from the sending node to the addressed node in the ad hoc wireless network of the embodiment will be explained with reference to FIG. 3. FIG. 3 is a flowchart for illustrating the method for communication. The flowchart illustrates in FIG. 3 a method for choosing an adjacent node as a destination node of data particularly for the data communication from the sending node X to the addressed node Y in relation to FIG. 1.

In FIG. 3, at first, the sending node X chooses an adjacent node as a destination node of data with reference to the successively updated link data and based on the link quality value between the self-node and the addressed node for every first period of time (step S1). As described earlier, the link quality value for every first period of time is gained for a relatively long period of time so that steady link quality is gained for a regular period of time, and is, e.g., a link quality value averaged every first period of time. Assume, at this moment, that the reference to the link data puts up two path candidates from the sending node X to the addressed node Y, which are a path via the adjacent node A1 and a path via the adjacent node A2 (refer to FIG. 1). In that case, the sending node X compares the link quality values for every first period of time of the respective path candidates with each other with reference to the link data, and chooses the one of good link quality, i.e., either one of the path candidates of link quality better than a specific first quality value. Then, the sending node X chooses the adjacent node which passes the chosen path as the destination node (e.g., the adjacent node A1 in FIG. 3).

Then, assume that the sending node X transmits data to the adjacent node A1 chosen as the destination node (step S2), resulting in unsuccessful data communication. That is, assume a case in which the sending node X works a timer which waits for a retransmission control signal "ACK" and does not receive the signal "ACK" before the time is up (step S3). In this way, although a path candidate is chosen based on averagely good link quality for a long period of time, short-term degradation of the link quality between the sending node and the adjacent node may possibly cause a case in which the signal "ACK" cannot be received.

Then, the sending node X chooses an adjacent node as a destination node of the data with reference to the successively updated link data and based on the link quality value between the self-node and the adjacent node for every second period of time (step S4). At this moment, the sending node X compares the link quality values for every second period of time for a plurality of adjacent nodes which can be connected to the data-addressed node with reference to the link data, and chooses one of good link quality, i.e., one of the adjacent nodes of link quality better than a specific second quality value (e.g., the adjacent node A2 in FIG. 3).

Then, the sending node X retransmits the data to the adjacent node A2 chosen at the step S4 as the destination node (step S5). As an adjacent node is chosen as the destination node based on the link quality gained every relatively short period of time at the step S4, the sending node X can transmit the data to the adjacent node being of good link quality at the moment of the data transmission even if the link quality is shortly degraded between the sending node and the adjacent node. If the data communication consequently succeeds, the sending node X receives the signal "ACK" as the retransmission control signal (step S6).

If the data transmission to the node A1 is completed, the node A1 works as a sending node of the data and carries out a similar process as that of the node X illustrated in FIG. 3. As the above operation is repeated, the respective nodes autonomously and successively update the optimum path of the data in the ad hoc wireless network of the embodiment, and the data is transmitted from the node X to the node Y.

According to the ad hoc wireless network of the embodiment, as explained above, the sending node chooses an adjacent node as a destination node based on link quality to the addressed node for every relatively long first period of time so as to newly transmit data to the addressed node. Then, the sending node chooses an adjacent node as a destination node based on link quality with the adjacent node for every relatively short second period of time so as to retransmit the data. That is, even if the link quality is shortly degraded between the sending node and the adjacent node to which the data is newly transmitted, the short-term change of the link quality is reflected for the data retransmission so that a proper adjacent t node is chosen as the destination node. Thus, in a case where link quality is shortly degraded with an adjacent node, the sending node is prevented from repeating data retransmission to the adjacent node, and a data communication delay between the nodes is reduced.

(2) Second Embodiment

An ad hoc wireless network of a second embodiment will be explained below.

Figures 4, 5:
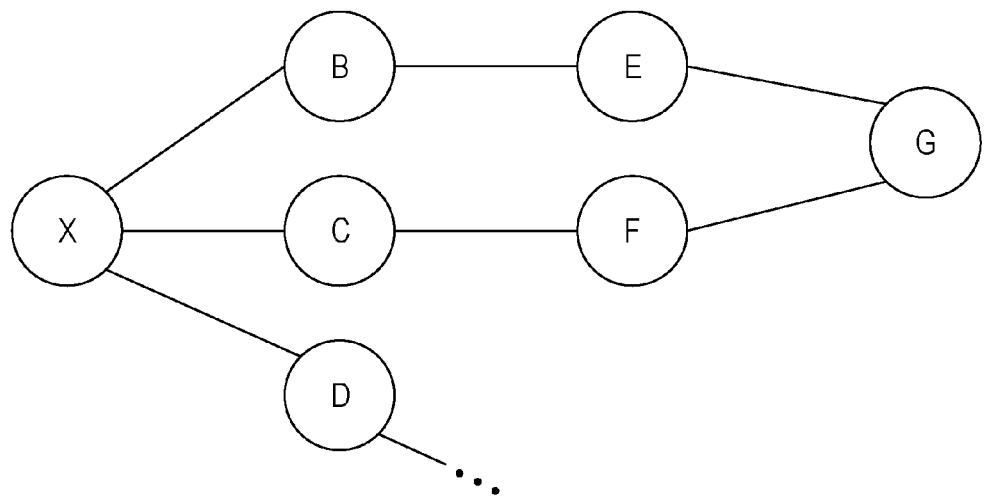
FIG. 4 illustrates an exemplary configuration of an ad hoc wireless network of a second embodiment.
FIG. 5 illustrates exemplary data included in a HELLO packet broadcast by a node of the second embodiment.

(2-1) Ad hoc Wireless Network of the Embodiment:

FIG. 4 illustrates an exemplary configuration of the ad hoc wireless network of the embodiment. The ad hoc wireless network illustrated in FIG. 4 includes nodes X and B-G which are wireless communication devices. Assume that the node X transmits data to the node G in the above ad hoc wireless network. That is, the nodes X and G are a sending node and an addressed node, respectively.

Each of the nodes broadcasts a HELLO packet to other nodes as a control packet in the network. The HELLO packet broadcast by each of the nodes includes data concerning an adjacent node and an average link quality value between the self-node and the adjacent node. The average link quality value corresponds to the link quality value for every first period of time of the first embodiment, and a value for which a plurality of samples of instantaneous link quality values are averaged for a regular period of time.

FIG. 5 illustrates exemplary data included in the HELLO packet. FIG. 5 illustrates exemplary data included in the HELLO packet broadcast from the node X in the network illustrated in FIG. 4. FIG. 5 illustrates that adjacent nodes of the node X are nodes B, C and D, and average link quality values with the adjacent nodes are AS_b, AS_c and AS_d, respectively.

The link data of the first embodiment (refer to FIG. 2) corresponds to data of a topology list and an instantaneous link quality list of the embodiment. Each of the nodes of the embodiment successively produces and updates the topology list and the instantaneous link quality list.

What are written from the link data illustrated in FIG. 2 onto the topology list are the data concerning the adjacent nodes (FIG. 2(a)), the nodes which can be connected to each of the adjacent nodes (FIG. 2(c)) and the average link quality values as the link quality values between the self-node and other nodes for every first period of time (FIG. 2(d)). FIG. 6 illustrates an exemplary topology list of the sending node X in the ad hoc wireless network illustrated in FIG. 4. FIG. 6 illustrates, e.g., that the nodes E and G exist as nodes which can be connected to the node B adjacent to the node X, and that the link quality values between the node X and the nodes E and G are AS_e and AS_g1, respectively. FIG. 6 similarly illustrates that the nodes F and G exist as nodes which can be connected to the node C adjacent to the node X, and that the link quality values between the node X and the nodes F and G are AS_f and AS_g2, respectively.

What are written from the link data illustrated in FIG. 2 onto the instantaneous link quality list are the instantaneous link quality values as the link quality values between the self-node X and the respective adjacent nodes for every second period of time. FIG. 7 illustrates an exemplary instantaneous link quality list of the sending node X in the ad hoc wireless network illustrated in FIG. 4. FIG. 7 illustrates, e.g., that the instantaneous link quality values between the node X and the adjacent nodes B, C and D are IS_b, IS_c and IS_d, respectively.

Figure 8:
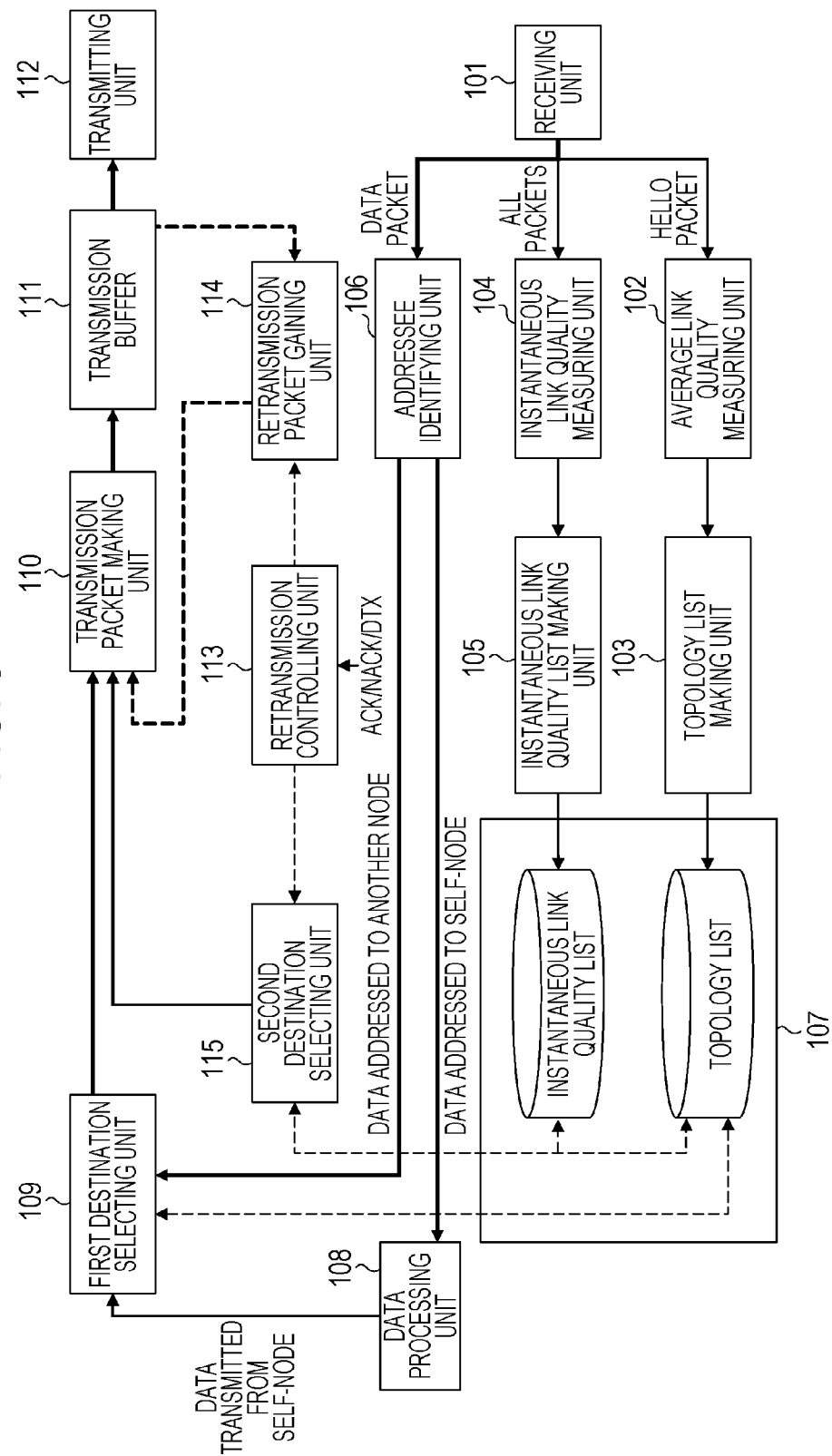
FIG. 8 is a block diagram for illustrating a configuration of the node of the second embodiment.

(2-2) Configuration of Node:

Then, a configuration of the node as a wireless communication device will be explained with reference to FIG. 8. As illustrated in FIG. 8, the node includes a receiving unit 101, an average link quality measuring unit 102, a topology list making unit 103, an instantaneous link quality measuring unit 104, an instantaneous link quality list making unit 105, an addressee identifying unit 106, a data storing unit 107, a data processing unit 108, a first destination selecting unit 109, a transmission packet making unit 110, a transmission buffer 111, a transmitting unit 112, a retransmission controlling unit 113, a retransmission packet gaining unit 114 and a second destination selecting unit 115.

(2-2-1) Broadcast HELLO Packet:

The node configured as illustrated in FIG. 8 works so as to produce and periodically broadcast a HELLO packet, as follows. That is, the node tries to communicate with an adjacent node after being activated or at regular intervals. The node knows the adjacent node by establishing a communication session with the adjacent node. Then, the average link quality measuring unit 102 measures wireless quality (SINR, etc.) of the HELLO packets coming from the respective adjacent nodes and/or a degree of traffic congestion, etc., so as to gain an average link quality value every specific first period of time. The average link quality value is a value for which a plurality of samples of instantaneous link quality values (instantaneous values of the wireless quality and/or the degree of traffic congestion) are averaged for a regular period of time. Then, the transmission packet making unit 110 makes a HELLO packet including data concerning the adjacent nodes and the average link quality value between the self-node and the adjacent nodes. Then, the transmitting unit 112 transmits the HELLO packet to the adjacent nodes.

(2-2-2) Produce Topology List:

The node configured as illustrated in FIG. 8 works so as to produce a topology list, as follows. That is, the receiving unit 101 receives a HELLO packet broadcast from another node and provides the average link quality measuring unit 102 with the HELLO packet. The average link quality measuring unit 102 measures wireless quality (SINR, etc.) and/or a degree of traffic congestion with an adjacent node based on the HELLO packet coming from the adjacent node, and reports what is measured to the topology list making unit 103. Further, the average link quality measuring unit 102 transfers to the topology list making unit 103 a HELLO packet transferred from a node except the adjacent node. The topology list making unit 103 makes a topology list as exemplarily illustrated in FIG. 6 based on what is measured by the average link quality measuring unit 102 and data included in the HELLO packet transferred from another node.

At this moment, the average link quality value between the self-node and the respective nodes which can be connected to the nodes adjacent to the self-node are calculated based on the product of average link quality values between adjacent two nodes on the path between the two nodes multiplied together. In FIG. 6, e.g., the average link quality value between the node X being the self-node and the node G is calculated as follows. The average link quality measuring unit 102 measures the average link quality value AS_b between the node X and the adjacent node B. Further, the average link quality value AS_be between the node B and the node E is included in a HELLO packet transmitted from the node B or E. The average link quality value AS_eg between the node E and the node G is included in a HELLO packet transmitted from the node E or G. Then, the node X calculates the average link quality value from the self-node to the node G based on an operation of $(AS\_b)*(AS\_be)*(AS\_eg)$.

The topology list made by the topology list making unit 103 is stored in the data storing unit 107 and is successively updated.

Figure 9:
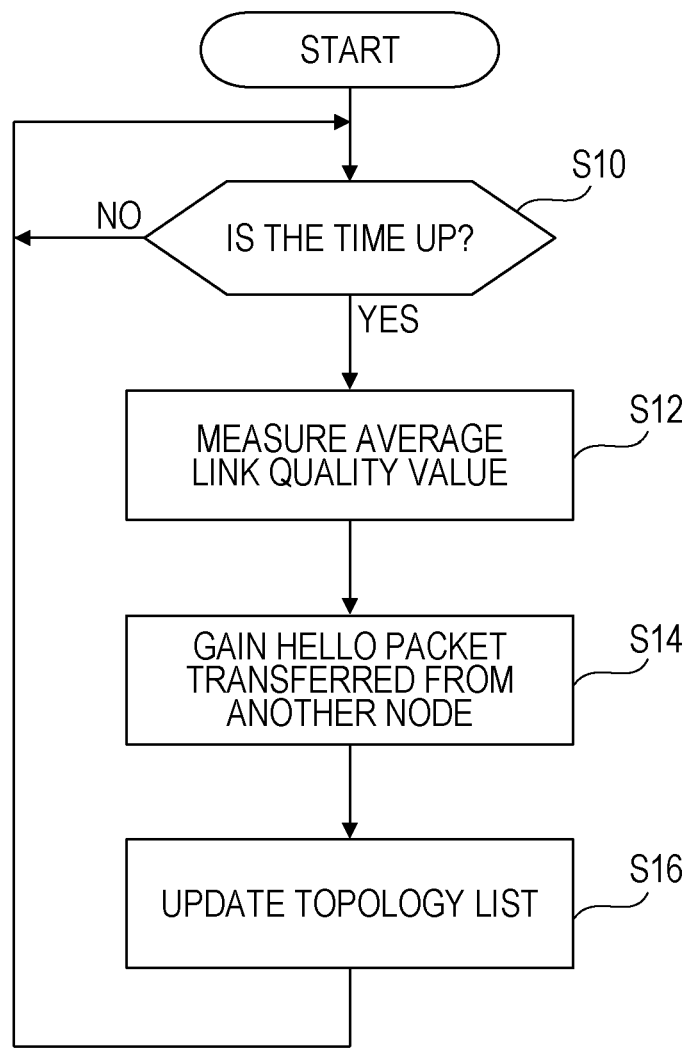
FIG. 9 is a flowchart for illustrating a process in which the node of the second embodiment updates the topology list.

FIG. 9 is a flowchart for illustrating a process for updating the topology list. The process illustrated in FIG. 9 is carried out every regular period of time required for gaining a plurality of samples of instantaneous link quality values, e.g., when the average link quality value is measured. If the regular period of time passes (step S10), the plural samples of instantaneous link quality values are averaged, and the average link quality value is measured (step S12). HELLO packets transferred from the nodes except the adjacent nodes are successively gained (step S14). The topology list is updated based on results of the steps S12 and S14 (step S16).

(2-2-3) Produce Instantaneous Link Quality List:

The node configured as illustrated in FIG. 8 works so as to produce an instantaneous link quality list, as follows. That is, the receiving unit 101 provides the instantaneous link quality measuring unit 104 with all packets received from other nodes. That is, all packets, not limited to a HELLO packet, such as a unicast packet or a packet including a retransmission control signal are used so that the instantaneous link quality is measured between the self-node and the adjacent node. The instantaneous link quality measuring unit 104 measures the instantaneous link quality value as the link quality value between the self-node and each of the adjacent nodes for every second period of time, and reports what is measured to the instantaneous link quality list making unit 105. The instantaneous link quality list making unit 105 makes an instantaneous link quality list as exemplarily illustrated in FIG. 7 based on what is measured by the instantaneous link quality measuring unit 104.

The instantaneous link quality list made by the instantaneous link quality list making unit 105 is stored in the data storing unit 107, and is successively updated.

Figure 10:
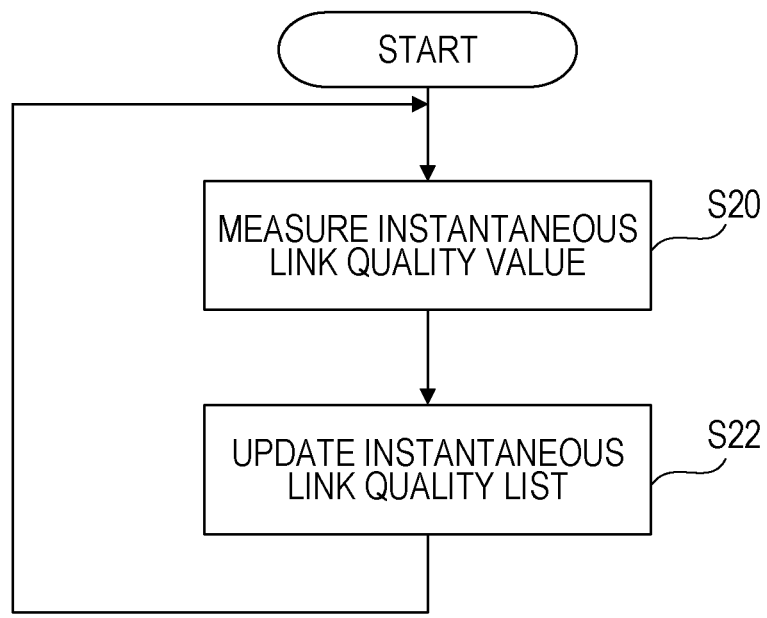
FIG. 10 is a flowchart for illustrating a process in which the node of the second embodiment updates the instantaneous link quality list.

FIG. 10 is a flowchart for illustrating a process for updating the instantaneous link quality list. According to the process illustrated in FIG. 10, at first, an instantaneous value of the link quality value is measured (step S20). Then, the instantaneous link quality list is updated based on a result of the step S20 (step S22).

(2-2-4) Transmit Data Packet Originated at Self-Node:

The sending node configured as illustrated in FIG. 8 works so as to transmit a data packet originated at the self-node, as follows. That is, the data processing unit 108 produces data having a determined addressed node, and provides the first destination selecting unit 109 with the produced data. The first destination selecting unit 109 selects an adjacent node as a destination node with reference to the topology list in order to transmit new data, and reports the selected node to the transmission packet making unit 110. The transmission packet making unit 110 makes a data packet having a header including data of the addressed node and the destination node selected by the first destination selecting unit 109. The data packet is once stored in the transmission buffer 111, and is transmitted by the transmitting unit 112.

At this moment, the first destination selecting unit 109 selects an adjacent node as a destination node, as follows. That is, the first destination selecting unit 109 searches the nodes which can be connected to the nodes adjacent to the self-node for the addressed node with reference to the topology list. If a plurality of addressed nodes which have been searched for exists, i.e., if a plurality of path candidates exists, the path candidate of the best average link quality value with the self-node is chosen, and the adjacent node which passes the candidate path is chosen.

The retransmission controlling unit 113 controls retransmission based on a retransmission control signal transmitted back from the destination node. That is, upon receiving no "ACK" signal before the time is up, the retransmission controlling unit 113 controls the retransmission packet gaining unit 114 so that the retransmission packet gaining unit 114 reads the data packet stored in the data storing unit 111 and provides the retransmission packet making unit 110 with the data packet. At this moment, the second destination selecting unit 115 selects an adjacent node as a retransmission destination of the data packet with reference to the instantaneous link quality list and the topology list depending upon control instructions from the retransmission controlling unit 113.

At this moment, the second destination selecting unit 115 selects an adjacent node as a destination node (retransmission destination node), as follows. That is, the second destination selecting unit 115 refers to the topology list first, so as to search for an adjacent node which can be connected to the addressed node. Then, the second destination selecting unit 115 refers to the instantaneous link quality list, so as to select the one of the best instantaneous link quality value with the self-node from the adjacent nodes which can be connected to the addressed node.

(2-3) Transmission Process of Node:

Then, the process in which the sending node transmits data in the ad hoc wireless network of the embodiment will further be explained with reference to a flowchart illustrated in FIG. 11.

Figure 11:
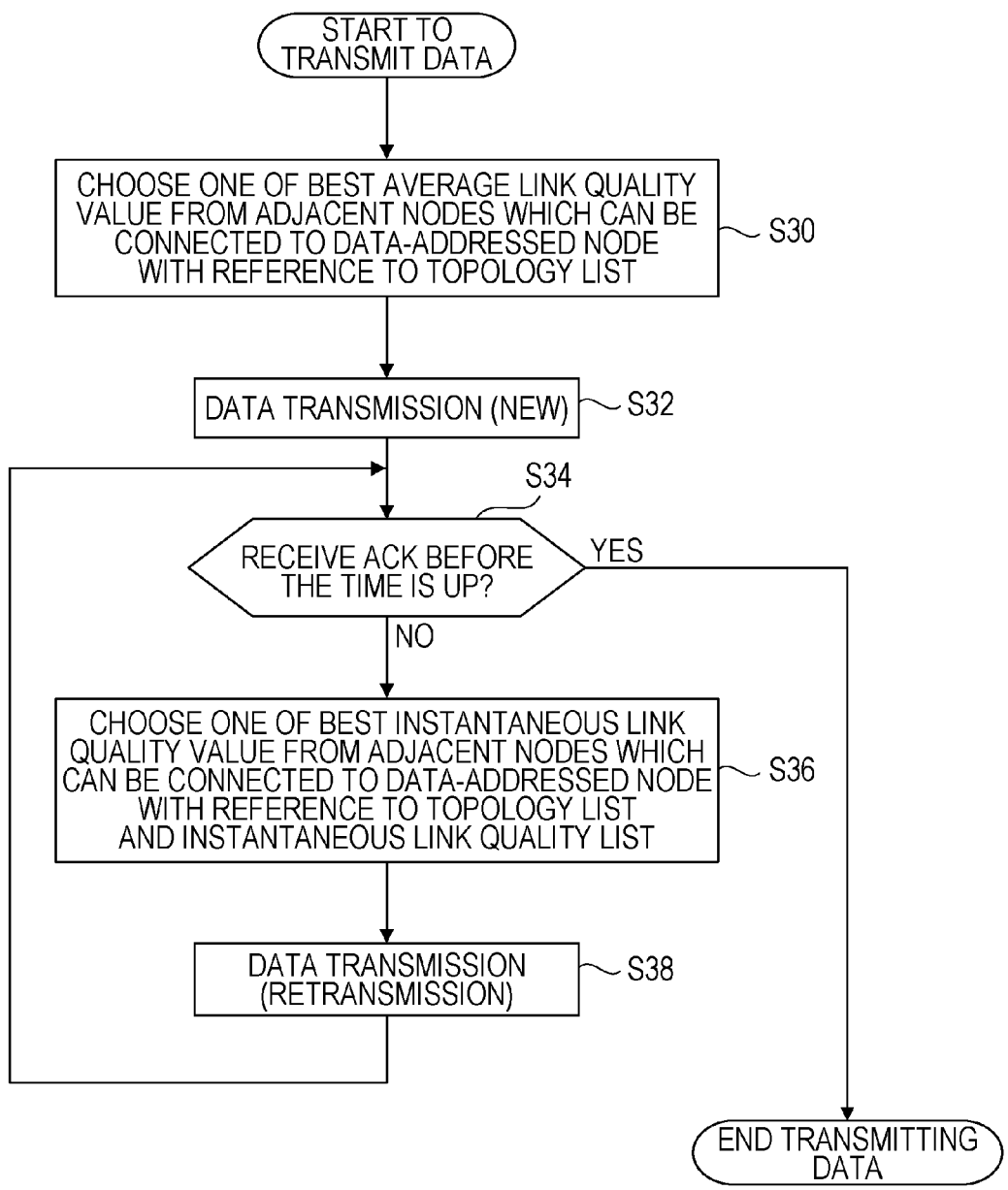
FIG. 11 is a flowchart for illustrating a process in which the node of the second embodiment transmits data.

In FIG. 11, at first, the first destination selecting unit 109 of the data-sending node chooses the one of the best average link quality value between the self-node and the addressed node from the adjacent nodes which can be connected to the data-addressed node with reference to the topology list (step S30).

Then, the sending node produces and newly transmits a data packet including the data to be transmitted to the adjacent node chosen as the destination node at the step S30 (step S32).

Incidentally, although the adjacent node chosen at the step S30 is the one of the best average link quality value, the choice is not limited to the above. Any one of a plurality of adjacent nodes of an average link quality value better than a certain threshold can be chosen, or some of them can be chosen in combination with other condition.

If the sending node receives a retransmission control signal "ACK" from the destination node before the time is up after the data transmission at the step S32 (YES of step S34), the data transmission is completed. Then, the destination node carries out a similar process. Adjacent nodes will be autonomously chosen as destination nodes in the ad hoc wireless network until the data is transmitted to the addressed node.

Unless the sending node receives a retransmission control signal "ACK" from the destination node before the time is up after the data transmission at the step S32 (NO of step S34), the retransmission process is carried out. That is, the second destination selecting unit 115 of the data-sending node chooses the one of the best instantaneous link quality value from the adjacent nodes which can be connected to the data-addressed node with reference to the topology list and the instantaneous link quality list (step S36). Then, the sending node produces and retransmits a data packet including the data to be transmitted to the adjacent node chosen as the destination node at the step S36 (step S38).

Incidentally, although the adjacent node chosen at the step S36 is the one of the best instantaneous link quality value, the choice is not limited to the above. Any one of a plurality of adjacent nodes of an instantaneous link quality value better than a certain threshold can be chosen, or some of them can be chosen in combination with other condition.

According to the ad hoc wireless network of the embodiment, similarly as the first embodiment as explained above, even if the link quality is instantaneously degraded between the sending node and the adjacent node to which the data is newly transmitted, the instantaneous change of the link quality is reflected in the choice of a proper adjacent node as the destination node for data retransmission. Thus, in a case where link quality is instantaneously degraded with an adjacent node, the sending node is prevented from repeating data retransmission to the adjacent node, and a data communication delay between the nodes can be reduced.

(3) Third Embodiment

A node which forms an ad hoc wireless network of a third embodiment will be explained below. The node of the embodiment measures a plurality of instantaneous link quality values so as to choose an adjacent node as a destination node for data retransmission more properly than the node of the second embodiment does.

Figure 12:
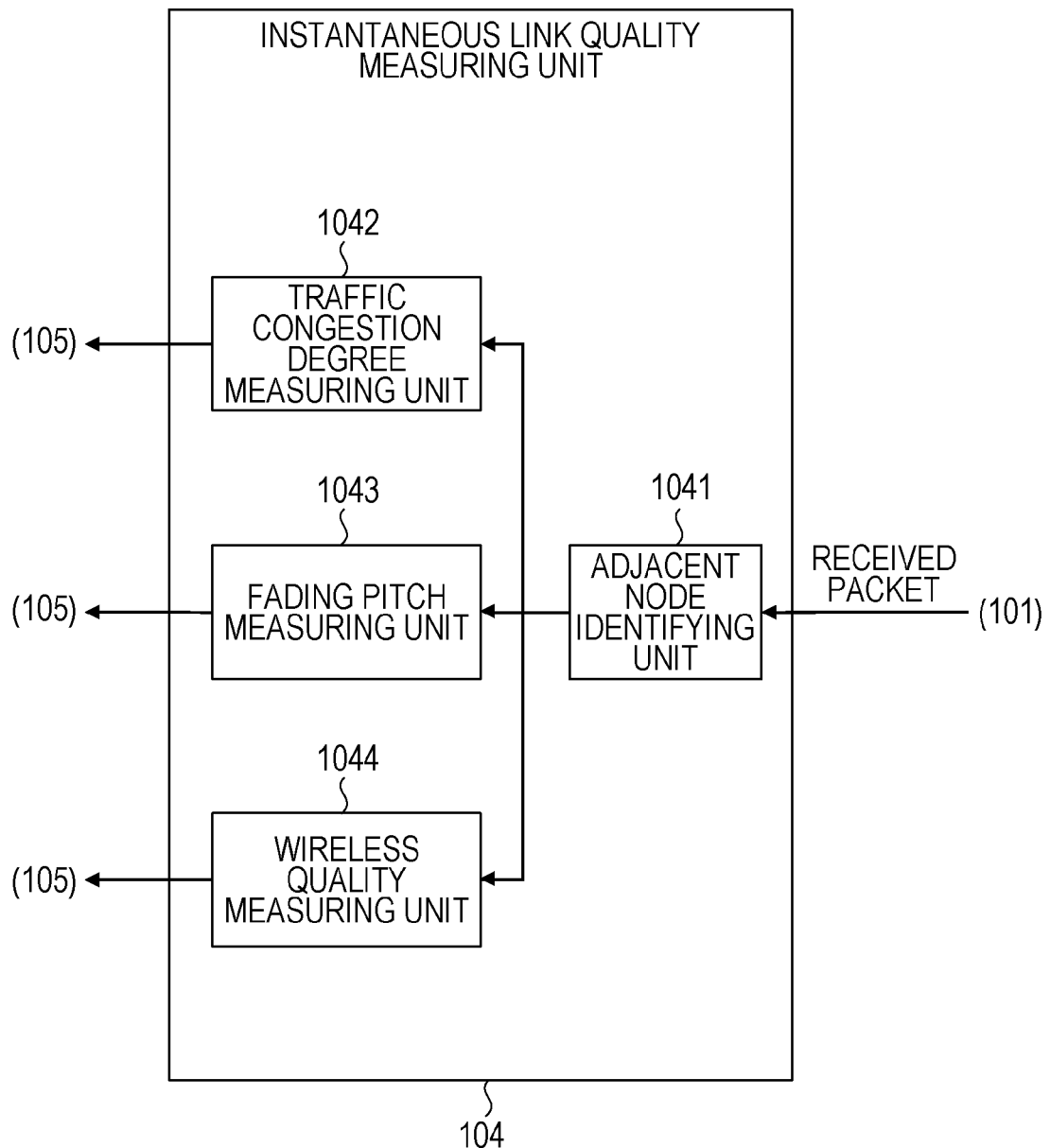
FIG. 12 schematically illustrates a configuration of an instantaneous link quality measuring unit of a node of a third embodiment.

(3-1) Node Configuration:

FIG. 12 schematically illustrates a configuration of an instantaneous link quality measuring unit 104 of the node of the embodiment. Each of the other portions of the node of the embodiment except for the link quality measuring unit 104 is a same as illustrated in FIG. 8, and its repetitive explanation is omitted.

As illustrated in FIG. 12, the instantaneous link quality measuring unit 104 of the node of the embodiment has an adjacent node identifying unit 1041, a traffic congestion degree measuring unit 1042, a fading pitch measuring unit 1043 and a wireless quality measuring unit 1044.

The adjacent node identifying unit 1041 identifies whether a received packet coming from the receiving unit 101 is transmitted from an adjacent node. If the received packet is transmitted from the adjacent node, the received packet is provided to the traffic congestion degree measuring unit 1042, the fading pitch measuring unit 1043 and the wireless quality measuring unit 1044.

The traffic congestion degree measuring unit 1042 measures a degree of traffic congestion with every adjacent node. The fading pitch measuring unit 1043 measures an interval of bottoms of electric field strength of a reference signal included in a packet coming from every adjacent node, i.e., fading pitch.

The wireless quality measuring unit 1044 measures one of the values of SINR, SNR, CINR and RSSI described above as a value indicating wireless quality (called "wireless quality value" hereafter) of the packet coming from every adjacent node. Each of the measuring units measures an instantaneous value every short period of time (the second period of time described above), and successively provides the instantaneous link quality list making unit 105 with the measured value.

The instantaneous link quality list making unit 105 makes an instantaneous link quality list including the wireless quality value, the degree of traffic congestion and the fading pitch as the wireless quality values for every adjacent node. FIG. 13 illustrates an exemplary instantaneous link quality list. The instantaneous link quality list made by the instantaneous link quality list making unit 105 is stored in the data storing unit 107 and is successively updated.

(3-2) Transmission Process of Node:

Then, a process in which the sending node transmits data in the ad hoc wireless network of the embodiment will be explained with reference to FIG. 14.

Figure 14:
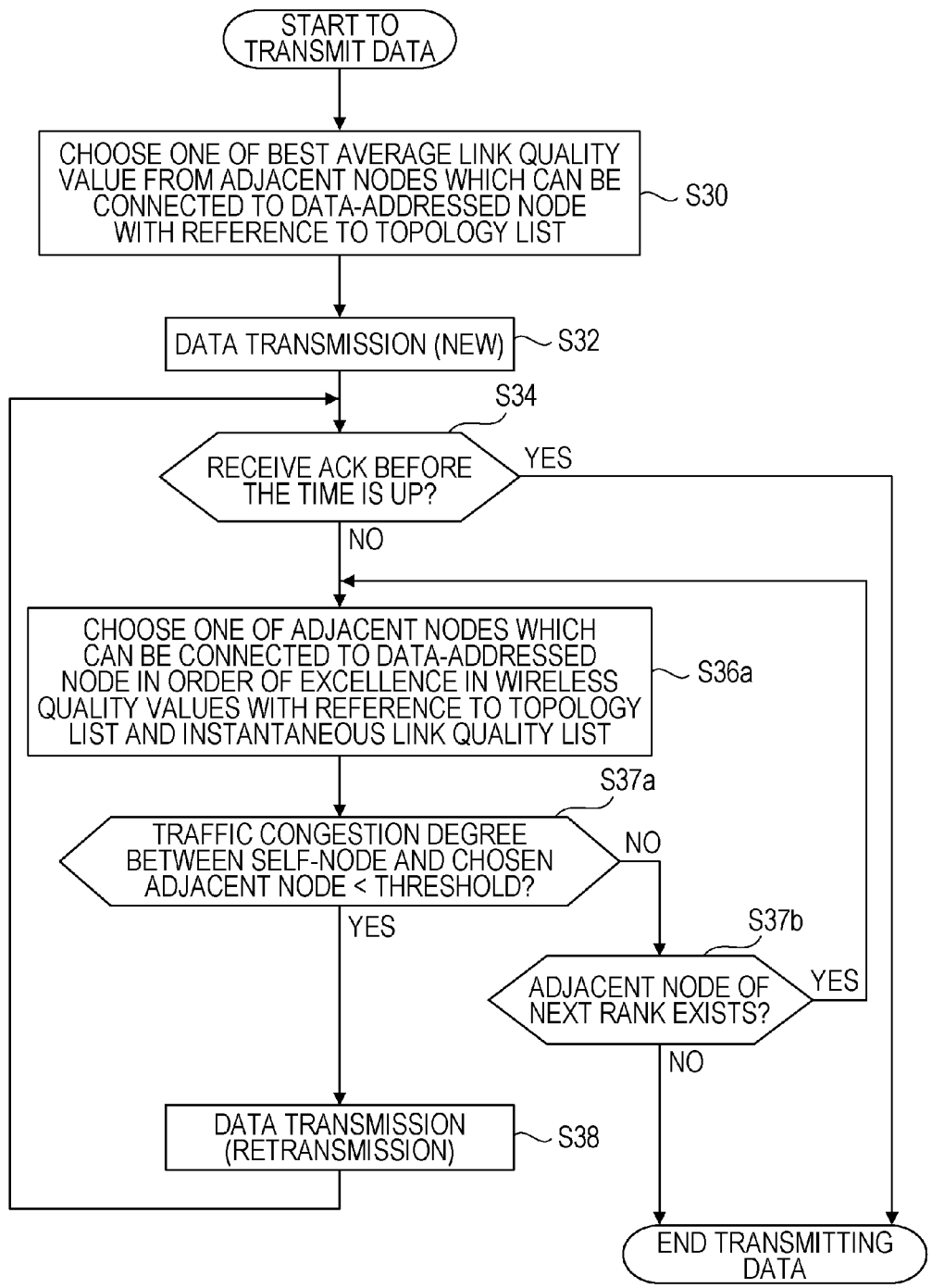
FIG. 14 is a flowchart for illustrating a process in which the node of the third embodiment transmits data.

In FIG. 14, at first, the first destination selecting unit 109 of the data-sending node chooses the one of the best average link quality value between the self-node and the addressed node from the adjacent nodes which can be connected to the data-addressed node with reference to the topology list (step S30). Then, the sending node produces and newly transmits a data packet including the data to be transmitted to the adjacent node chosen as the destination node at the step S30 (step S32).

If the sending node receives a retransmission control signal "ACK" from the destination node before the time is up after the data transmission at the step S32 (YES of step S34), the data transmission is completed. Then, the destination node carries out a similar process. Adjacent nodes will be autonomously chosen as destination nodes in the ad hoc wireless network until the data is transmitted to the addressed node. The above process is a same as illustrated in FIG. 11.

Unless the sending node receives a retransmission control signal "ACK" from the destination node before the time is up after the data transmission at the step S32 (NO of step S34), the retransmission process is carried out. At this moment, the second destination selecting unit 115 of the data-sending node chooses the one of the adjacent nodes which can be connected to the data-addressed node in order of excellence in wireless quality values with reference to the topology list and the instantaneous link quality list (step S36a). Further, the sending node identifies with reference to the instantaneous link quality list whether the degree of traffic congestion with the adjacent node chosen at the step S36a is smaller than a certain threshold (step S37a). If the degree of traffic congestion is smaller than the threshold, the process shifts to a step S38 so that the sending node produces a data packet including data to be transmitted and retransmits the data packet to the adjacent node chosen at the step S36a as the destination node (step S38). An adjacent node of such good wireless quality and less traffic congestion degree is chosen that the data retransmission succeeds more probably.

Meanwhile, if the traffic congestion degree is greater than a certain threshold at the step S37a, the process shifts to a step S37b. If a plurality of adjacent nodes which can be connected to the addressed node exists (YES of step S37b), the process returns to the step S36a and an adjacent node which ranks next in the wireless quality value is chosen.

Incidentally, the adjacent node which can be chosen at the step S36a should preferably be limited to one of wireless quality value with the adjacent node being better than a certain threshold. A reason why is, unless the wireless quality is good to a certain extent, the sending node can be highly possibly unable to establish a wireless communication session with the adjacent node even if the traffic is not congested.

According to the ad hoc wireless network of the embodiment, as explained above, the sending node preferably chooses an adjacent node of good wireless quality and not so much traffic congestion as a destination node for data retransmission. Thus, the node of the embodiment can highly possibly choose an adjacent node as the retransmission destination node more properly than the node of the second embodiment does.

(4) Fourth Embodiment

A node which forms an ad hoc wireless network of a fourth embodiment will be explained below. Although having same portions as those of the node of the third embodiment, the node of the embodiment carries out a transmission process different from that of the third embodiment.

Figure 15:
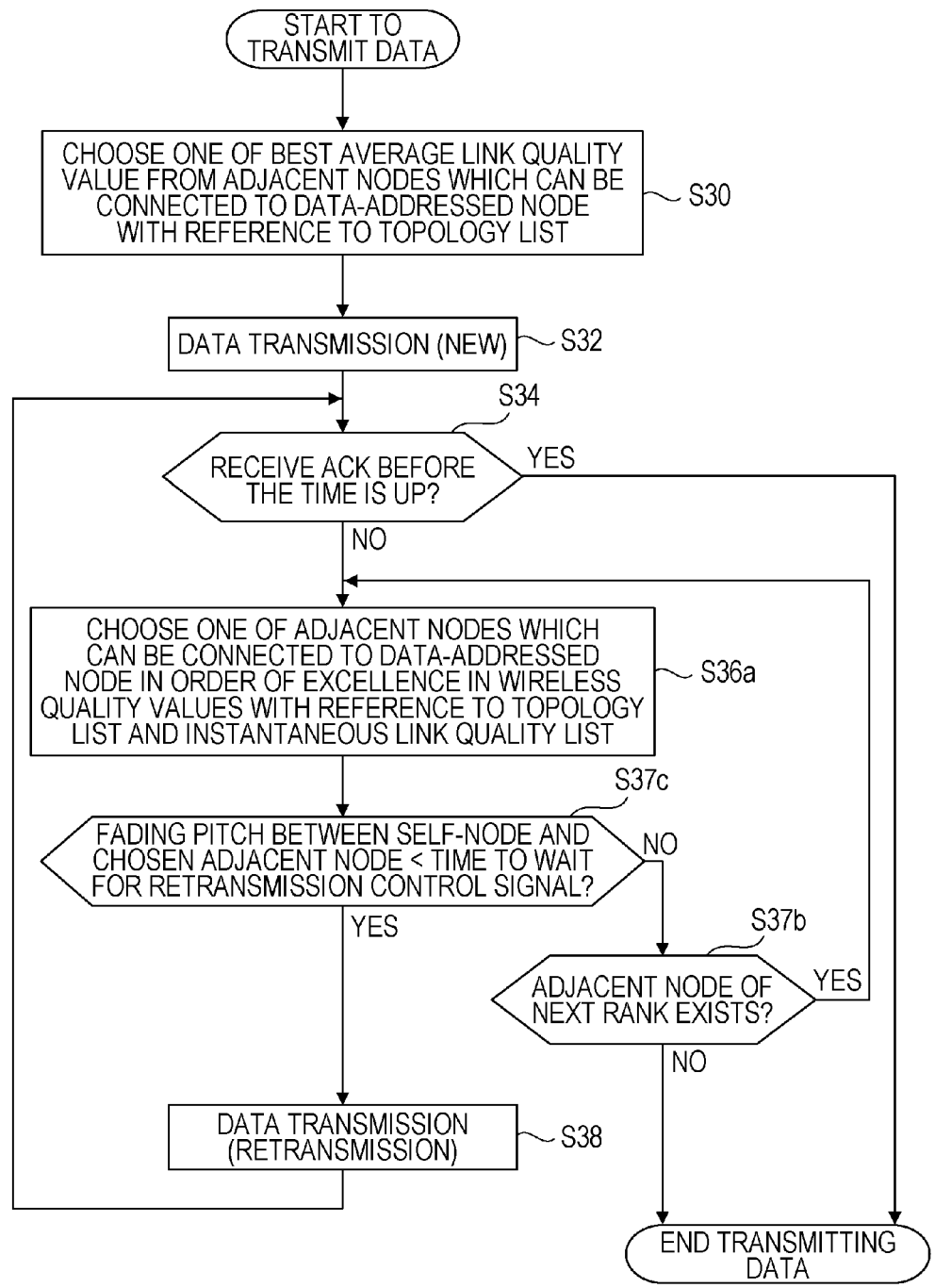
FIG. 15 is a flowchart for illustrating a process in which the node of a fourth embodiment transmits data.

FIG. 15 illustrates a flowchart of the transmission process carried out by the node of the embodiment. FIG. 15 is same as FIG. 14 except for the process of a step S37c.

According to the transmission process illustrated in FIG. 15, fading pitch is identified instead of the traffic congestion degree. That is, the sending node identifies whether the fading pitch in the wireless communication with the adjacent node chosen at the step S36a is shorter than a period of time to wait for the retransmission control signal (step S37c). If the fading pitch is shorter than the period of time to wait for the retransmission control signal, the process shifts to the step S38 so that the data is retransmitted. In this event, the period of time to wait for the retransmission control signal is since the data packet is transmitted to the adjacent node and until the retransmission control signal ("ACK", "NACK" or "DTX") is received from the adjacent node. A certain period of time can be preset as the period of time to wait for the retransmission control signal. Instead, in the process of the steps S32-S34, the period of time to wait can be practically measured based on the time of transmission at the step S32 and the time of receiving, e.g., "NACK".

A reason why the fading pitch is compared with the period of time to wait for the retransmission control signal in the process of the embodiment is as follows. That is, unsuccessful transmission of new data at the step S32 is conceivably caused by the data transmission carried out at the timing of a bottom of the electric field strength of a signal transferred between the sending node and the adjacent node owing to the fading. At this moment, if the fading pitch is longer than the period of time to wait for the retransmission control signal, the bottom of the electric field strength of the signal continues until the timing of data retransmission upon receiving the retransmission control signal and the data is highly possibly retransmitted again at the timing of the continuing bottom of the electric field strength of the signal. Meanwhile, if the fading pitch is shorter than the period of time to wait for the retransmission control signal, the bottom of the electric field strength of the signal does not continue until the timing of data retransmission upon receiving the retransmission control signal, and the data is highly possibly retransmitted at the timing of recovered electric field strength of the signal. According to the flowchart illustrated in FIG. 15, it is thereby identified that the data retransmission probably succeeds in a case where the fading pitch is shorter than the period of time to wait for the retransmission control signal.

According to the ad hoc wireless network of the embodiment, as explained above, the sending node preferably chooses an adjacent node of good wireless quality and fading pitch being shorter than the period of time to wait for the retransmission control signal as a destination node for data retransmission. Thus, the node of the embodiment can highly possibly choose an adjacent node as the retransmission destination node more properly than the node of the second embodiment does, similarly as the third embodiment.

Figure 16:
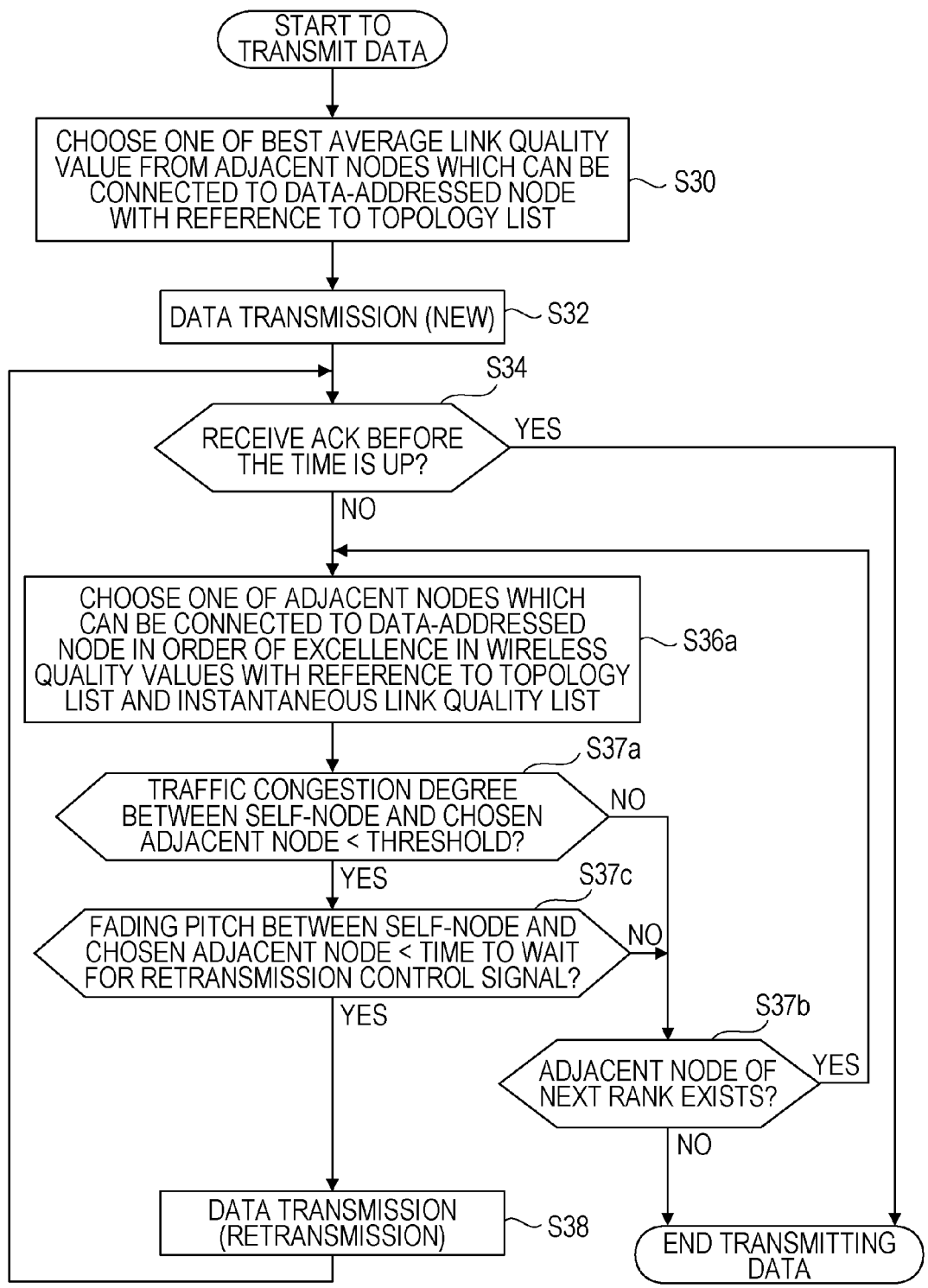
FIG. 16 is a flowchart for illustrating a process in which a node of a modified embodiment transmits data.

The embodiments of the invention have been explained above in detail. The wireless communication device and the method for wireless communication of the invention is not limited to the above embodiments, and can be variously modified or changed within the scope of the invention as a matter of course. The individual features mentioned for the respective embodiments can be suitably combined. As illustrated in FIG. 16, e.g., the identifying processes S37*a* and S37*c* in FIGS. 14 and 15, respectively, can be combined so that the node carries out the transmission process. The sending node can thereby highly possibly choose an adjacent node as a retransmission destination node further more properly.

According to the wireless communication device and the method for wireless communication disclosed herewith, extension of a period of time required for data communication between nodes can be reduced in a wireless network to which a plurality of nodes belongs for carrying out ad hoc communication.

As mentioned above, the present invention has been specifically described for better understanding of the embodiments thereof and the above description does not limit other aspects of the invention. Therefore, the present invention can be altered and modified in a variety of ways without departing from the gist and scope thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A communication device capable of transmitting packets to a destination device via any of a plurality of adjacent devices, the communication device comprising:
   a first measuring unit configured to measure a plurality of first link qualities of a plurality of path candidates between the communication device and the destination device for a first period of time based on packets transmitted between the communication device and the destination device, each of the plurality of first link qualities being obtained from link qualities of links between adjacent devices located on a corresponding path candidate from the communication device to the destination device;
   a second measuring unit configured to measure a plurality of second link qualities between the communication device and the plurality of adjacent devices for a second period of time shorter than the first period of time based on the packets transmitted between the communication device and the destination device;
   a first selector configured to select a first adjacent device from the plurality of adjacent devices based on the measured first link qualities of the plurality of path candidates when the communication device transmits a new packet to the destination device; and
   a second selector configured to select a second adjacent device from the plurality of adjacent devices based on the measured second link qualities between the communication device and the plurality of adjacent devices for transmission upon failure of the transmission of the new packet, the second adjacent device being different from the first adjacent device;
   wherein a first link quality of the plurality of first link qualities is obtained from wireless qualities or degrees of traffic congestion of the links between adjacent devices located on the corresponding plurality of path candidates from the communication device to the destination device, and a second quality of the plurality of second link qualities is a wireless quality, a degree of traffic congestion, or a fading pitch of a wireless communication between the communication device and the adjacent device;
   wherein the second selector is further configured to select the second adjacent device from the plurality of adjacent devices in order of excellence in wireless quality and based on judging whether the fading pitch is shorter than a period of time to wait for a retransmission control signal or not.

2. The communication device of claim 1, wherein the second selector is further configured to select the second adjacent device from the plurality of adjacent devices in order of excellence in wireless quality based on judging whether the degree of traffic congestion is smaller than a threshold or not.

3. The communication device of claim 1, wherein the second selector is further configured to select the second adjacent device from the plurality of adjacent devices in order of excellence in wireless quality based on judging whether the degree of traffic congestion is smaller than a threshold or not and based on judging whether a fading pitch is shorter than a period of time to wait for a retransmission control signal or not.

4. A method of controlling a communication device capable of transmitting packets to a destination device via any of a plurality of adjacent devices, the method comprising:
   measuring a plurality of first link qualities of a plurality of path candidates between the communication device and the destination device for a first period of time based on packets transmitted between the communication device and the destination device, each of the plurality of first link qualities being obtained from link qualities of links between adjacent devices located on a corresponding path candidate from the communication device to the destination device;
   measuring a plurality of second link qualities between the communication device and the plurality of adjacent devices for a second period of time shorter than the first period of time based on the packets transmitted between the communication device and the destination device;

selecting a first adjacent device from the plurality of adjacent devices based on the measured first link qualities of the plurality of path candidates when the communication device transmits a new packet to the destination device; and selecting a second adjacent device from the plurality of adjacent devices based on the measured second link qualities between the communication device and the plurality of adjacent devices for transmission upon failure of the transmission of the new packet, the second adjacent device being different from the first adjacent device;

wherein a first link quality of the plurality of first link qualities is obtained from wireless qualities or degrees of traffic congestion of the links between adjacent devices located on the corresponding path candidates from the communication device to the destination device, and a second quality of the plurality of second link qualities is a wireless quality, a degree of traffic congestion, or a fading pitch of a wireless communication between the communication device and the adjacent device;

wherein the selecting selects the second adjacent device from the plurality of adjacent devices in order of excellence in wireless quality based on judging whether the fading pitch is shorter than a period of time to wait for a retransmission control signal or not.

5. The method of claim 4, wherein the selecting selects the second adjacent device from the plurality of adjacent devices in order of excellence in wireless quality based on judging whether the degree of traffic congestion is smaller than a threshold or not.

6. The method of claim 4, further comprising selecting the second adjacent device from the plurality of adjacent devices in order of excellence in wireless quality based on judging whether the degree of traffic congestion is smaller than a threshold or not and based on judging whether the fading pitch is shorter than a period of time to wait for a retransmission control signal or not.

7. A communication device comprising:
a transmitter transmitting packets to a destination device via any of a plurality of adjacent devices; and
a processor configured for controlling measuring a plurality of first link qualities of a plurality of path candidates between the communication device and the destination device for a first period of time based on packets transmitted between the communication device and the destination device, each of the plurality of first link qualities being obtained from link qualities of links between adjacent devices located on a corresponding path candidate from the communication device to the destination device, measuring a plurality of second link qualities between the communication device and the plurality of adjacent devices for a second period of time shorter than the first period of time based on the packets transmitted between the communication device and the destination device, selecting a first adjacent device from the plurality of adjacent devices based on the measured first link qualities of the plurality of path candidates when the communication device transmits a new packet to the destination device, and selecting a second adjacent device from the plurality of adjacent devices based on the measured second link qualities between the communication device and the plurality of adjacent devices for transmission upon failure of the transmission of the new packet, the second adjacent device being different from the first adjacent device;

wherein a first link quality of the plurality of first link qualities is obtained from wireless qualities or degrees of traffic congestion of the links between adjacent devices located on the corresponding path candidates from the communication device to the destination device, and a second quality of the plurality of second link qualities is a wireless quality, a degree of traffic congestion, or a fading pitch of a wireless communication between the communication device and the adjacent device;

wherein the selecting selects the second adjacent device from the plurality of adjacent devices in order of excellence in wireless quality based on judging whether the fading pitch is shorter than a period of time to wait for a retransmission control signal or not.

* * * * *